US007884700B2

(12) United States Patent  
Ishiguchi

(10) Patent No.: US 7,884,700 B2
(45) Date of Patent: Feb. 8, 2011

(54) COMPOSITE ELECTRONIC APPARATUS

(75) Inventor: Fusao Ishiguchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1063 days.

(21) Appl. No.: 11/652,499

(22) Filed: Jan. 12, 2007

(65) Prior Publication Data

US 2007/0176733 A1 Aug. 2, 2007

(30) Foreign Application Priority Data

Jan. 16, 2006 (JP) .............................. 2006-007376

(51) Int. Cl.
G05B 23/02 (2006.01)
(52) U.S. Cl. .................. 340/3.71; 340/825.72; 348/734
(58) Field of Classification Search ............ 340/825.72, 340/825.69, 825.22, 825.24, 825.25, 815.6, 340/426.13, 3.71; 348/734
See application file for complete search history.

(56) References Cited

U.S. PATENT DOCUMENTS

| 4,623,887 | A | * | 11/1986 | Welles, II | ............. | 340/825.57 |
| 4,626,848 | A | * | 12/1986 | Ehlers | .................. | 340/825.69 |
| 4,825,200 | A | * | 4/1989 | Evans et al. | .................... | 341/23 |
| 4,856,081 | A | * | 8/1989 | Smith | ...................... | 455/151.4 |
| 4,908,604 | A | * | 3/1990 | Jacob | .................... | 340/539.16 |
| 5,181,024 | A | * | 1/1993 | Tsunoda et al. | ........ | 340/825.69 |
| 5,974,235 | A | * | 10/1999 | Nunally et al. | .............. | 709/202 |
| 6,031,573 | A | * | 2/2000 | MacCormack et al. | . | 375/240.16 |
| 6,507,306 | B1 | * | 1/2003 | Griesau et al. | ............. | 341/176 |
| 6,564,005 | B1 | * | 5/2003 | Berstis | ....................... | 386/83 |
| 6,803,874 | B1 | * | 10/2004 | Weber | ....................... | 341/176 |
| 6,879,351 | B1 | * | 4/2005 | Brown | ........................ | 348/734 |
| 7,429,979 | B2 | * | 9/2008 | Mears et al. | ................ | 345/172 |
| 2004/0205821 | A1 | * | 10/2004 | Yamada et al. | ............... | 725/80 |
| 2005/0062636 | A1 | * | 3/2005 | Conway et al. | ............. | 341/176 |
| 2006/0092038 | A1 | * | 5/2006 | Unger | .................. | 340/825.25 |
| 2006/0132326 | A1 | * | 6/2006 | Fang et al. | ............. | 340/825.69 |

FOREIGN PATENT DOCUMENTS

| JP | A-2002-315080 | 10/2002 |
| JP | 3092372 | 12/2002 |
| JP | 3093882 | 2/2003 |
| JP | U-3093722 | 2/2003 |
| JP | A-2005-117160 | 4/2005 |

OTHER PUBLICATIONS

Samsung, CHT-420 Instruction Manual, Apr. 4, 2003, Samsung Electronics America, Inc., 11652499_20100331. Non-Final Rejection_20030412074742531_CHT-420-XAA-Eng_1_.pdf.*

* cited by examiner

*Primary Examiner*—Daniel Wu
*Assistant Examiner*—Rufus Point
(74) *Attorney, Agent, or Firm*—Morgan Lewis & Bockius LLP

(57) ABSTRACT

A composite electronic apparatus that prevents misoperation of a remote control device and provides easy remote control operations for electronic devices is provided. When a DVD mode switching key is pressed, for example, in this composite electronic apparatus, a DVD recognition LED is turned on. When a VCR mode switching key is pressed, a VCR recognition LED is turned on. In addition, when one of action command keys is pressed, the DVD recognition LED or the VCR recognition LED indicating an operation target is turned on in accordance with information indicating a transmission mode stored until the action command key is operated.

5 Claims, 7 Drawing Sheets

COMPOSITE ELECTRONIC APPARATUS

This application is based on Japanese Patent Application No. 2006-007376 filed on Jan. 16, 2006, the contents of which are hereby incorporated by reference.

BACKGROUND OF THE INVENTION

1. Field of the Invention

The present invention relates to a composite electronic apparatus including a remote control device that transmits different key code signals for operation and a main body of the composite electronic apparatus that is made up of a plurality of electronic devices having different functions (for example, a digital versatile disc (DVD) recorder, a video cassette recorder (VCR), and the like). In particular, the present invention relates to a composite electronic apparatus having a function of displaying a transmission mode of the remote control device.

2. Description of Related Art

Recent years, a composite electronic apparatus including a plurality of electronic devices, e.g., a DVD recorder and a VCR, has become widely available. Such a composite electronic apparatus is equipped with a remote control device, which transmits different key code signals for operation corresponding to different electronic devices included in the composite electronic apparatus. For example, when the remote control device is used for operating the VCR, the remote control device is switched to a VCR transmission mode by using a mode switching key. When the remote control device is used for operating the DVD recorder, the remote control device is switched to a DVD transmission mode by using the mode switching key. After that, an operation key that is common to the VCR and the DVD recorder is operated for obtaining a desired action of the VCR or the DVD.

However, if a user operates an action command key, i.e., the operation key that is common to the VCR and the DVD recorder, without having operated the mode switching key of the remote control device correctly, a key code signal corresponding to an electronic device that is not the electronic device wanted by the user will be transmitted from the remote control device. Therefore, there may be a case where the desired electronic device does not work for the user to view a picture or listen to music in spite of having operated the action command key.

For example, if the user wants to rewind a videocassette inserted into the VCR in the state where the DVD recorder is working so that sounds and pictures reproduced by the DVD recorder are outputted from a television set, the user is required to switch the mode switching key of the remote control device to the VCR transmission mode side and to operate a rewind key. After that, if the user forgets to reset the mode switching key of the remote control device to the DVD transmission mode side, the DVD recorder will not work as the user desires. For example, the DVD recorder in the state of a reproduction operation will not stop or pause even if the user operates a stop key or a pause key.

The conventional composite electronic apparatus does not inform the user of a current transmission mode of the remote control device, namely the VCR side or the DVD side. Therefore, the above-mentioned situation may occur. In the example described above, the user misunderstands that the current transmission mode is set to the DVD recorder side although it is actually set to the VCR side. In this case, there is a possibility that the user misunderstands that the remote control device is broken down because the DVD recorder does not work in spite of the operation of the stop key on the pause key of the remote control device.

JP-A-2002-315080 discloses another conventional technique, in which a user selects a desired electronic device from a plurality of available electronic devices by operating a VCR mode switching key, a TV mode switching key, or a DVD mode switching key. In this case, the key for operating the selected electronic device illuminates in the same color as the selected mode switching key. In addition, it is also possible to blink the selected mode switching key. However, the user cannot see which transmission mode, the VCR side, the TV side, or the DVD side has been set, just before operating the remote control device. For example, if the transmission mode just before the operation is set to the VCR side, the user cannot operate the TV or the DVD recorder. Therefore, in the case of this conventional technique too, there is a possibility that the user misunderstands that the remote control device is broken down.

Japanese utility model publication No. 3093722 discloses another conventional technique. When either a mode switching key for switching the transmission mode of the remote control device or an action command key for commanding switching of operation modes of the composite electronic apparatus is operated, the corresponding remote control signal is transmitted. Then, a two-color LED for indicating a transmission mode of the remote control device blinks for a predetermined period of time so as to indicate a current transmission mode of the remote control device. For example, if a red color LED blinks for a predetermined period of time, it is understood that the transmission mode of the remote control device is set to the VCR side. If a green color LED blinks for a predetermined period of time, it is understood that the transmission mode of the remote control device is set to the DVD side. However, if the user forgets that the blink of the red color LED indicates the transmission mode of the VCR side while the blink of the green color LED indicates the transmission mode of the DVD side, the user performs erroneous operation and, as a result, cannot operate the desired electronic device. Therefore, in the case of this conventional technique too, there is a possibility that the user misunderstands that the remote control device is broken down.

JP-A-2005-117160 discloses another conventional technique, in which it is determined whether or not a remote control signal received from the remote control device has a code corresponding to an output mode of the composite electronic apparatus. If the received remote control signal does not have the code corresponding to the output mode of the composite electronic apparatus, this is displayed on a screen of a monitor device. However, the user cannot see which side the current transmission mode of the remote control device is, the VCR side or the DVD side, before operating the remote control device. If the transmission mode just before the operation is set to the VCR side, the DVD recorder cannot be operated. Therefore, in the case of this conventional technique too, there is a possibility that the user misunderstands that the remote control device is broken down.

SUMMARY OF THE INVENTION

An object of the present invention is to provide a composite electronic apparatus that hardly causes a misoperation of the remote control device and that realizes an easy remote control operation for each electronic device.

A composite electronic apparatus according to an aspect of the present invention comprises a remote control device for transmitting different key code signals for operation and a main body of the composite electronic apparatus made up of a plurality of electronic devices having different functions. The remote control device includes a plurality of light emitting elements for recognizing transmission modes, the plurality of light emitting elements corresponding to mode switching keys implemented with press switches or slide switches for designating an operation target among a plurality of electronic devices, and a first light emitting element turning-on portion for turning on the light emitting element for recognizing a transmission mode corresponding to an operation of the mode switching key among the plurality of light emitting elements for recognizing transmission modes when the mode switching key is operated. The main body of the composite electronic apparatus includes a plurality of light emitting elements for recognizing operation modes and emitting light in the same color or different colors, plurality of light emitting elements corresponding to the plurality of electronic devices, and a light emitting element turning-on portion for turning on the light emitting element for recognizing a operation mode corresponding to the operation target of electronic device indicated in the key code signal received from the remote control device.

According to this structure, when the mode switching key is operated, a corresponding light emitting element for recognizing a transmission mode is turned on, so that a user can see which electronic device the transmission mode is set for. Thus, a misoperation of the remote control device can be prevented, and it is possible to provide easy remote control operations for electronic devices. In addition, the main body of the composite electronic apparatus turns on a light emitting element for recognizing an operation mode corresponding to the operation target of electronic device indicated in the key code signal received from the remote control device, so the user can confirm the current operation mode of the composite electronic apparatus.

In this way, since the remote control device is equipped with the light emitting element for recognizing a transmission mode while the main body of the composite electronic apparatus is equipped with the light emitting element for recognizing a operation mode, the user can fully understand the remote control operation. Therefore, a misoperation can be prevented, and usability of the apparatus is improved. This reduces a chance of misunderstanding of the user that the remote control device is broken down.

In a preferred embodiment of the present invention, the remote control device further includes a second light emitting element turning-on portion for turning on the light emitting element for recognizing a transmission mode when an action command key which is an operation key different from the mode switching key is operated, the light emitting element for recognizing a transmission mode being turned on to indicate the operation target in accordance with transmission mode information held until the action command key is operated. Since a light emitting element for recognizing a transmission mode is turned on based on an operation of an action command key, a user can see which electronic device the transmission mode of the remote control device is set for.

In a further preferred embodiment of the present invention, the remote control device further includes a light emitting element shutoff portion for turning off the light emitting element for recognizing a transmission mode which remains lit when a predetermined period has passed after the key code signal was transmitted. Since the light emitting element for recognizing a transmission mode can be turned off when a predetermined period of time has passed after the key code signal was transmitted, the power of a battery inside the remote control device can be less consumed.

In another preferred embodiment of the present invention, the main body of the composite electronic apparatus further includes a name display portion for making a display unit display a name of the operation target of an electronic device indicated by the key code signal received from the remote control device. According to this structure, the user can recognize the current operation mode of the composite electronic apparatus by characters.

DETAILED DESCRIPTION OF PREFERRED EMBODIMENTS

Figure 1:
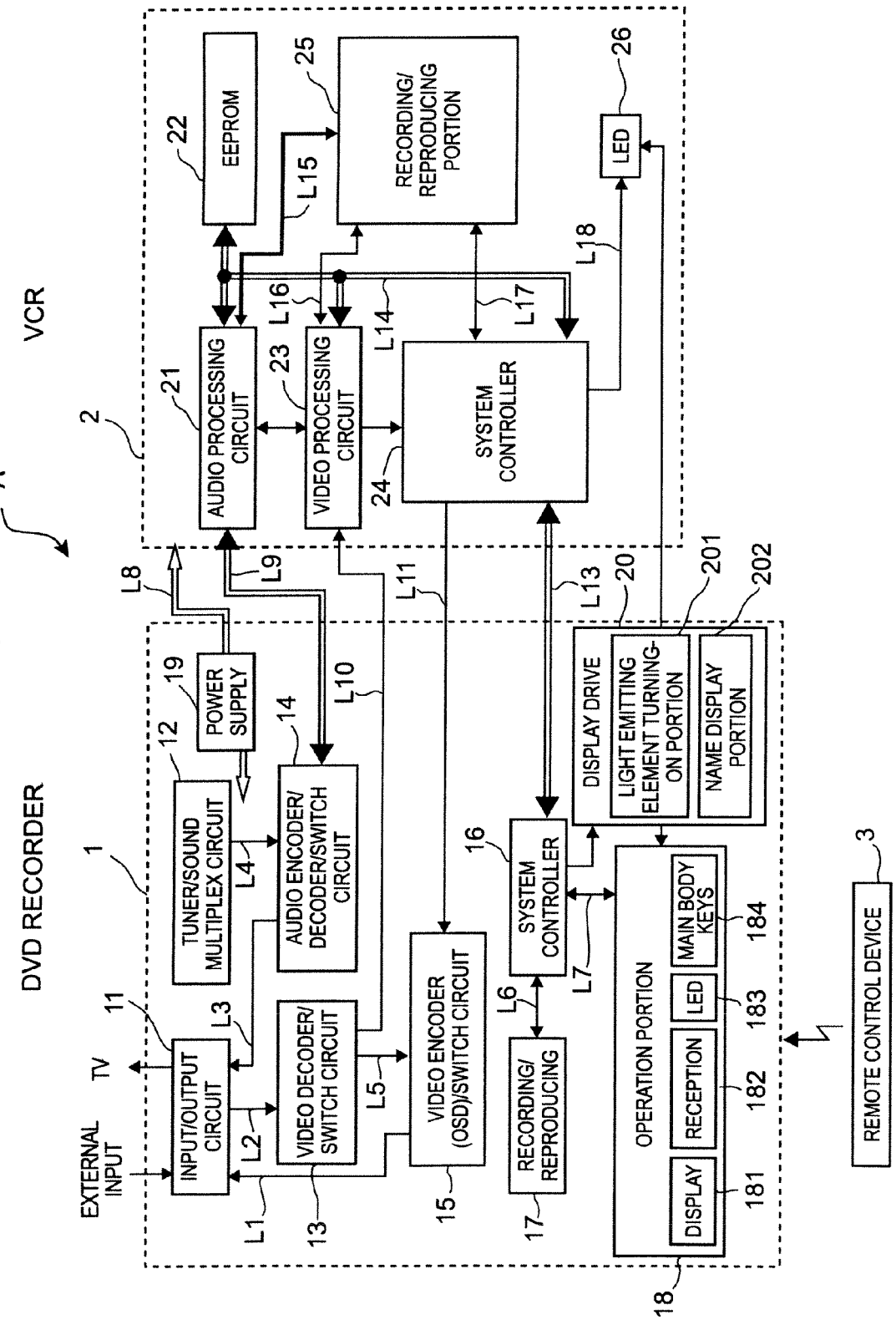
FIG. 1 is a block diagram showing a structure of a composite recording and reproducing apparatus according to an embodiment of the present invention.

Now an embodiment of the present invention will be described with reference to the attached drawings. FIG. 1 is a block diagram showing a structure of a composite recording and reproducing apparatus according to an embodiment of the present invention.

This composite recording and reproducing apparatus A is made up of a DVD (digital versatile disc) recorder 1 as an optical disc recording and reproducing device, a VCR (video cassette recorder) 2 as a magnetic recording and reproducing device, and a remote control device 3. Note that the VCR can be replaced with a VTR (video tape recorder). The DVD recorder 1 is equipped with an input and output circuit 11, a tuner/sound multiplex circuit 12, a video recorder/switch circuit 13, an audio encoder/decoder/switch circuit 14, a video encoder (OSD)/switch circuit 15, a system controller 16, a recording/reproducing portion 17, an operating portion 18, a power supply 19, and the like. The VCR 2 is equipped with an audio processing circuit 21, an EEPROM 22, a video processing circuit 23, a system controller 24, a recording/reproducing portion 25, LED (a light emitting diode) 26, and the like.

In the DVD recorder 1, the power supply 19 supplies electric power to each structural element of the DVD recorder 1 and each structural element of the VCR 2. The tuner/sound multiplex circuit 12 receives a television broadcast signal, selects a desired broadcast station, and outputs an audio-visual signal. It also selects a bilingual sound signal or a stereo sound signal received from the selected broadcast station and outputs the same. The audio encoder/decoder/switch circuit 14 includes an encoder for encoding a sound signal from the tuner/sound multiplex circuit 12, a decoder for decoding a sound signal from the audio processing circuit 21 of the VCR 2, and a switch circuit. This switch circuit selects between feeding the sound signal from the tuner/sound multiplex circuit 12 to the encoder of the audio encoder/decoder/switch circuit 14 and feeding the same to the audio processing circuit 21 of the VCR 2.

The input and output circuit 11 receives a video signal from an external device and outputs the same to the video recorder/switch circuit 13, while it receives the sound signal from the audio encoder/decoder/switch circuit 14 and outputs the same to the television set (TV). In addition, it supplies the video signal received from the video encoder (OSD)/switch circuit 15 to the television set, while it receives the video signal from the tuner/sound multiplex circuit 12 and supplies the same to the video recorder/switch circuit 13.

The video recorder/switch circuit 13 includes a decoder for decoding the video signal from the input and output circuit 11 and includes a switch circuit. This switch circuit selects between feeding the video signal from the input and output circuit 11 to the decoder and feeding the same to the video processing circuit 23 of the VCR 2. The video encoder (OSD)/switch circuit 15 includes an encoder (OSD) for encoding the video signal from the video recorder/switch circuit 13 and performing an OSD process thereof, and a switch circuit. This switch circuit selects between encoding the video signal from the video recorder/switch circuit 13 by the encoder so as to feed the encoded video signal to the input and output circuit 11 and feeding a video signal (composite signal) from the system controller 24 to the input and output circuit 11.

The recording/reproducing portion 17 includes a spindle motor for rotating a DVD and an optical pickup for writing/reading audio-visual information on the DVD optically. When this recording/reproducing portion 17 performs a recording process, it generates a modulated audio-visual signal by modulating the video signal from the video encoder (OSD)/switch circuit 15 and the sound signal from the audio encoder/decoder/switch circuit 14 and supplies the modulated audio-visual signal to the optical pickup for recording the audio-visual information on the DVD. When it performs a reproducing step, it extracts a video signal included in the RF signal from the DVD read by the optical pickup so as to supply the video signal to the video recorder/switch circuit 13 for decoding. The decoded signal is outputted as a reproduced video signal. In addition, the sound signal included in the RF signal is supplied to the audio encoder/decoder/switch circuit 14 for decoding. The decoded signal is outputted as a reproduced sound signal.

The operating portion 18 includes a display unit 181 for displaying operational information and the like, a reception portion 182 for receiving an infrared key code signal from the remote control device 3, a light emitting diode (LED) 183 for indicating an operation mode, a plurality of main body keys 184 for various operations and the like. This operating portion 18 is used not only for operating the DVD recorder 1 but also for operating the VCR 2. The system controller 16 controls each structural element of the DVD recorder 1. In addition, a display drive portion 20 is equipped with a light emitting element turning-on portion 201 for the DVD operation mode recognition LED 183 or the VCR operation mode recognition LED 26 corresponding to the operation target of electronic device indicated in the key code signal received from the remote control device 3, and a name display portion 202 for making the display unit 181 display a name of the operation target of electronic device indicated in the key code signal received from the remote control device 3. Note that the name display portion 202 is not necessary if a name of the operation target of electronic device is not displayed by the display unit 181.

In the VCR 2, the audio processing circuit 21 performs a predetermined process on the sound signal from the recording/reproducing portion 25 or on the sound signal from the audio encoder/decoder/switch circuit 14 of the DVD recorder 1. More specifically, the audio processing circuit 21 processes the reproduced sound signal from the recording/reproducing portion 25 so as to supply the signal to the audio encoder/decoder/switch circuit 14 of the DVD recorder 1, or it processes the sound signal from the audio encoder/decoder/switch circuit 14 so that the recording/reproducing portion 25 can record the signal, and supplies the signal to the recording/reproducing portion 25.

The video processing circuit 23 performs a predetermined process on the video signal from the recording/reproducing portion 25 or on the video signal from the video recorder/switch circuit 13 of the DVD recorder 1. More specifically, the video processing circuit 23 processes the reproduced video signal from the recording/reproducing portion 25 so as to supply the signal to the system controller 24, and it also processes the video signal from the video recorder/switch circuit 13 so that the recording/reproducing portion 25 can record the signal, and supplies the signal to the recording/reproducing portion 25. The EEPROM 22 is a non-volatile memory that is used for memorizing an operational state before power supply is disconnected even if the power is turned off.

The recording/reproducing portion 25 is equipped with a magnetic head for writing and reading audio-visual information on magnetic tape (a videocassette), a tape drive mechanism for driving loaded magnetic tape and the like. The LED 26 is a light emitting diode for indicating that the VCR 2 is in the operation mode or other state. The system controller 24 controls each structural element of the VCR 2.

In the DVD recorder 1, a line L1 is a signal line for supplying the video signal from the video encoder (OSD)/switch circuit 15 to the input and output circuit 11. A line L2 is a signal line for supplying the video signal from the input and output circuit 11 to the video recorder/switch circuit 13. A line L3 is a signal line for supplying the sound signal from the audio encoder/decoder/switch circuit 14 to the input and output circuit 11. A line L4 is a signal line for supplying the sound signal from the tuner/sound multiplex circuit 12 to the audio encoder/decoder/switch circuit 14. A line L5 is a signal line for supplying a video signal from the video recorder/switch circuit 13 to the video encoder (OSD)/switch circuit 15. A line L6 is a signal line for sending and receiving a signal between the system controller 16 and the recording/reproducing portion 17. A line L7 is a signal line for sending and receiving a signal between the system controller 16 and the operating portion 18.

A line L8 is a power supply line for supplying electric power to each structural element of the DVD recorder 1 and each structural element of the VCR 2. A line L9 is a signal line for sending a left channel sound signal and a right channel sound signal between the audio encoder/decoder/switch circuit 14 of the DVD recorder 1 and the audio processing circuit 21 of the VCR 2. A line L10 is a signal line for sending a video signal from the video recorder/switch circuit 13 of the DVD recorder 1 to the video processing circuit 23 of the VCR 2. A line L11 is a signal line for sending a video signal from the system controller 24 of the VCR 2 to the video encoder (OSD)/switch circuit 15 of the DVD recorder 1. A line L13 is a data bus line for sending and receiving data between the system controller 24 of the VCR 2 and the system controller 16 of the DVD recorder 1.

In the VCR 2, a line L14 is a data bus line that connects the audio processing circuit 21, the EEPROM 22, the video processing circuit 23, and the system controller 24 to each other. A line L15 is a signal line for sending and receiving a signal between the audio processing circuit 21 and the recording/reproducing portion 25. A line L16 is a signal line for sending and receiving a signal between the video processing circuit 23 and the recording/reproducing portion 25. A line L17 is a signal line for sending and receiving a signal between the system controller 24 and the recording/reproducing portion 25. A line L18 is a signal line for supplying a drive signal from the system controller 24 to the LED 26.

Figure 2:
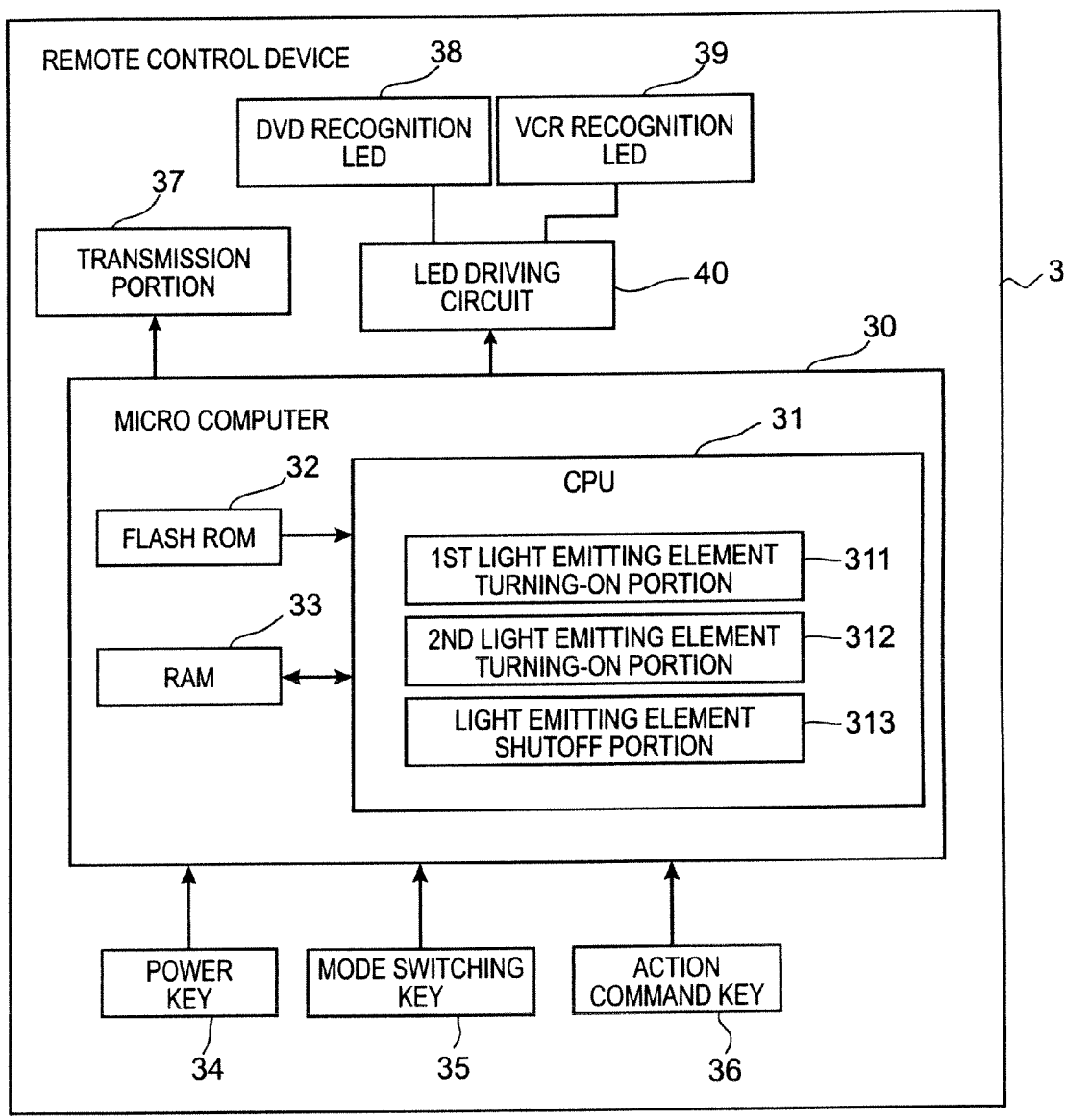
FIG. 2 is a block diagram showing a structure of a remote control device according to the present embodiment.

FIG. 2 is a block diagram showing a structure of the remote control device in the present embodiment. In FIG. 2, the remote control device 3 is equipped with a micro computer 30 that includes a CPU 31 for controlling the entire device, a flash ROM 32 that stores a program necessary for the CPU 31 to perform processing and controlling, and a RAM 33 that stores temporarily data necessary for the CPU 31 to perform processing and controlling. In addition, the remote control device 3 is equipped with a power key 34 for turning on and off the power supply to a main body portion of a composite electronic apparatus A (see FIG. 1), a mode switching key 35 for switching an output mode of the main body portion of the composite electronic apparatus A, and a plurality of common action command keys 36 for commanding actions of the DVD recorder 1 and the VCR 2 included in the main body portion of the composite electronic apparatus A.

In addition, the remote control device 3 is equipped with a transmission portion 37 for transmitting an infrared key code signal after receiving a remote control signal from the micro computer 30, a DVD recognition LED 38 for letting the user recognize that the transmission mode of the remote control is set to the transmission mode to the DVD recorder 1, a VCR recognition LED 39 for letting the user recognize that the transmission mode of the remote control is set to the transmission mode to the VCR 2, and an LED driving circuit 40 for driving the DVD recognition LED 38 or the VCR recognition LED 39 in accordance with the transmission mode signal from the micro computer 30.

The CPU 31 includes, as a feature of the present embodiment, a first light emitting element turning-on portion 311, a second light emitting element turning-on portion 312, and a light emitting element shutoff portion 313. When the mode switching key 35 is operated, the first light emitting element turning-on portion 311 turns on the recognition LED, which corresponds to the operation of the mode switching key 35, out of the DVD recognition LED 38 and the VCR recognition LED 39 provided so as to correspond to the operation of the mode switching key 35. The mode switching key 35 is implemented with a press switch or a slide switch for designating an operation target out of the DVD recorder 1 and the VCR 2 (see FIG. 1). When the action command key 36 is pressed, the second light emitting element turning-on portion 312 turns on the operation mode recognition LED indicating the operation target corresponding to the transmission mode information immediately before the current operation of the action command key 36. The light emitting element shutoff portion 313 turns off the operation mode recognition LED when a predetermined period of time has passed after the key code signal was transmitted.

Figure 3:
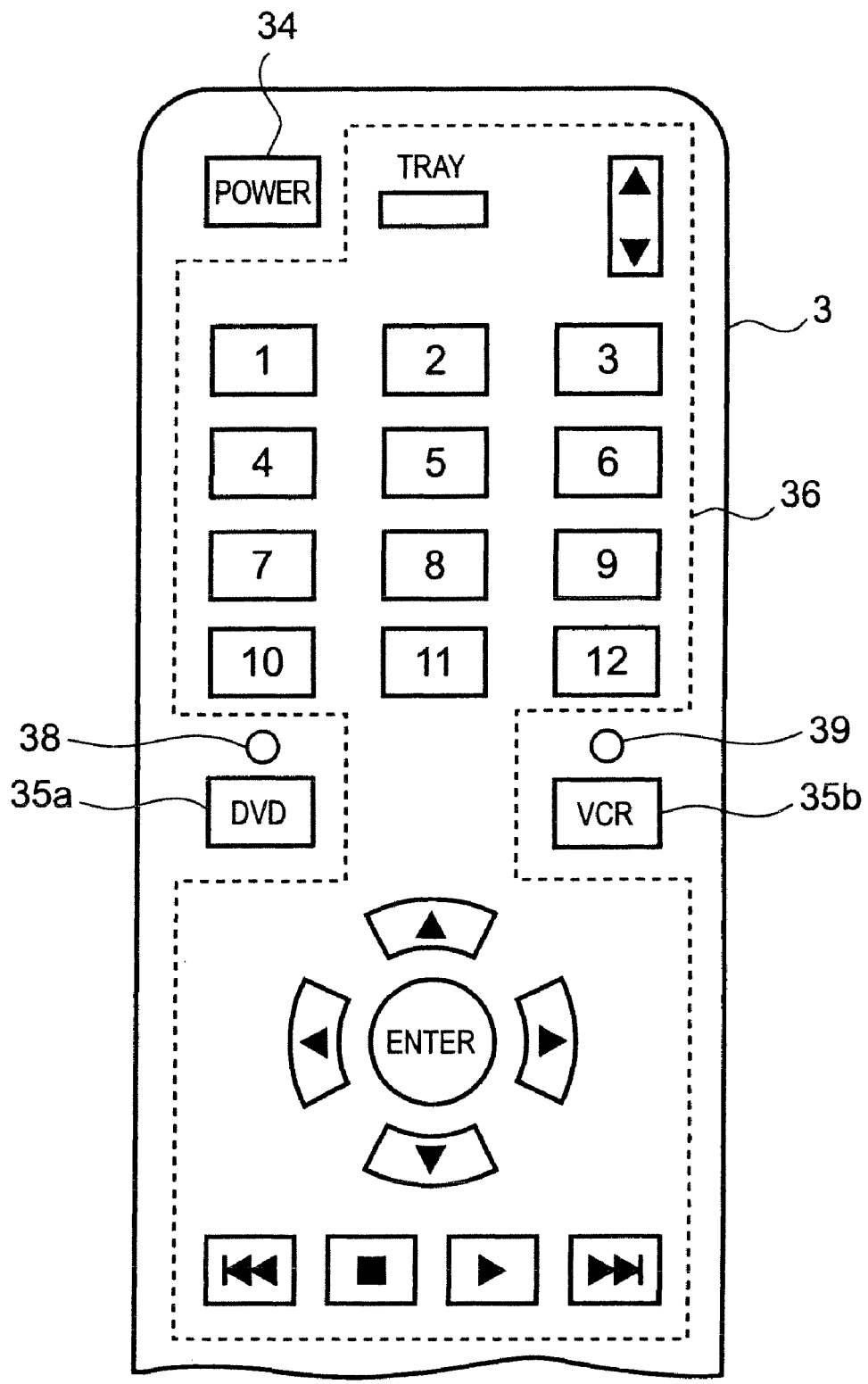
FIG. 3 is a diagram showing an example of a key arrangement of the remote control device according to the present embodiment.

FIG. 3 shows an example of a key arrangement of the remote control device in the present embodiment. In FIG. 3, the remote control device 3 is equipped with a power key 34, a DVD mode switching key 35a and a VCR mode switching key 35b as the mode switching keys, and the action command keys 36 including a plurality of numeric keys. In addition, as a feature of the present embodiment, the remote control device 3 has the DVD recognition LED 38 arranged at the side of the DVD mode switching key 35a and the VCR recognition LED 39 arranged at the side of the VCR mode switching key 35b. Note that the key arrangement illustrated in the drawing is merely an example, and the present invention is not limited to this key arrangement.

Figure 4:
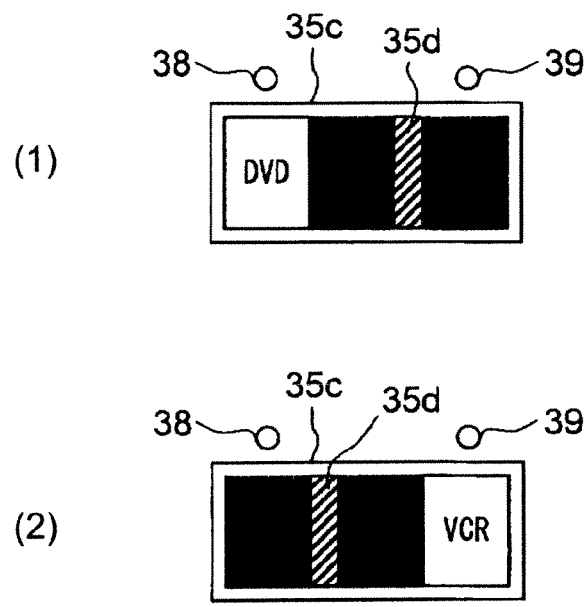
FIG. 4 is a diagram showing a structure of a slide switch that can be used instead of the DVD mode switching key and the VCR mode switching key shown in FIG. 3.

FIG. 4 shows a structure of a slide switch that can be used instead of the DVD mode switching key 35a and the VCR mode switching key 35b shown in FIG. 3. In FIG. 4, a slide switch 35c is switched to the DVD transmission mode when a knob 35d is slid to the right side, and a character string "DVD" is displayed as shown in the section (1) of FIG. 4. In this case, the DVD recognition LED 38 is turned on. In addition, the slide switch 35c is switched to the VCR transmission mode when the knob 35d is slid to the left side, and a character string "VCR" is displayed as shown in the section (2) of FIG. 4. In this case, the VCR recognition LED 39 is turned on.

Figure 5:
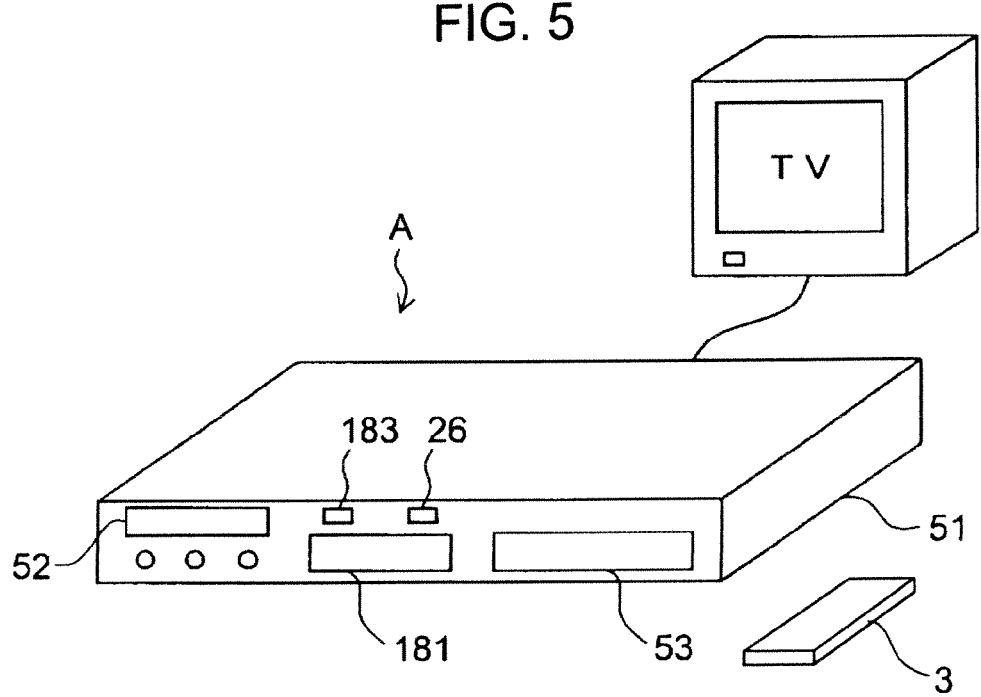
FIG. 5 is a perspective view showing an appearance of the composite electronic apparatus according to the present embodiment in a simplified manner.

FIG. 5 is a perspective view showing an appearance of the composite electronic apparatus of the present embodiment in a simplified manner. In FIG. 5, in addition to the remote control device 3, the composite electronic apparatus A includes, at an operational panel (operating portion) on the front side of an enclosure 51, a DVD tray 52 for inserting the DVD, a video cassette slot 53 for inserting a videocassette, the display unit 181, the DVD operation mode recognition LED 183, the VCR operation mode recognition LED 26, and the like.

Figure 6:
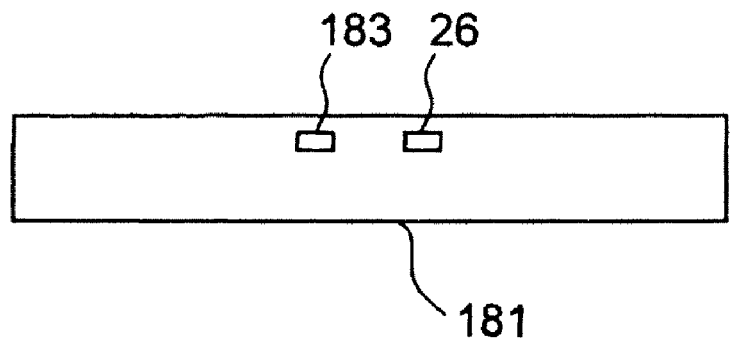
FIG. 6 is a diagram showing an example of a display unit equipped with a DVD operation mode recognition LED and a VCR operation mode recognition LED shown in FIG. 5.
Figure 7:
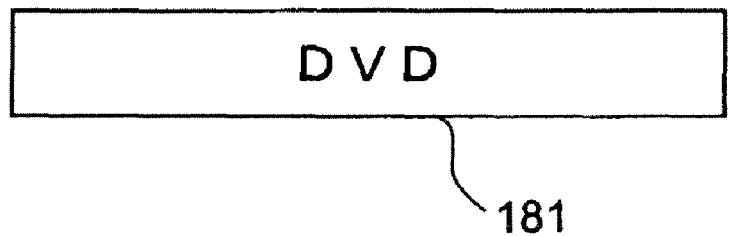
FIG. 7 is a diagram showing an example of a display unit that indicates an operation mode with characters instead of the DVD operation mode recognition LED and the VCR operation mode recognition LED shown in FIG. 6.

FIG. 6 shows an example of the display unit 181 equipped with the DVD operation mode recognition LED 183 and the VCR operation mode recognition LED 26 shown in FIG. 5. Furthermore, FIG. 7 shows an example of the display unit 181 that indicates the operation mode with a character string (for example, "DVD") instead of the DVD operation mode recognition LED 183 and the VCR operation mode recognition LED 26 shown in FIG. 6.

Figure 8:
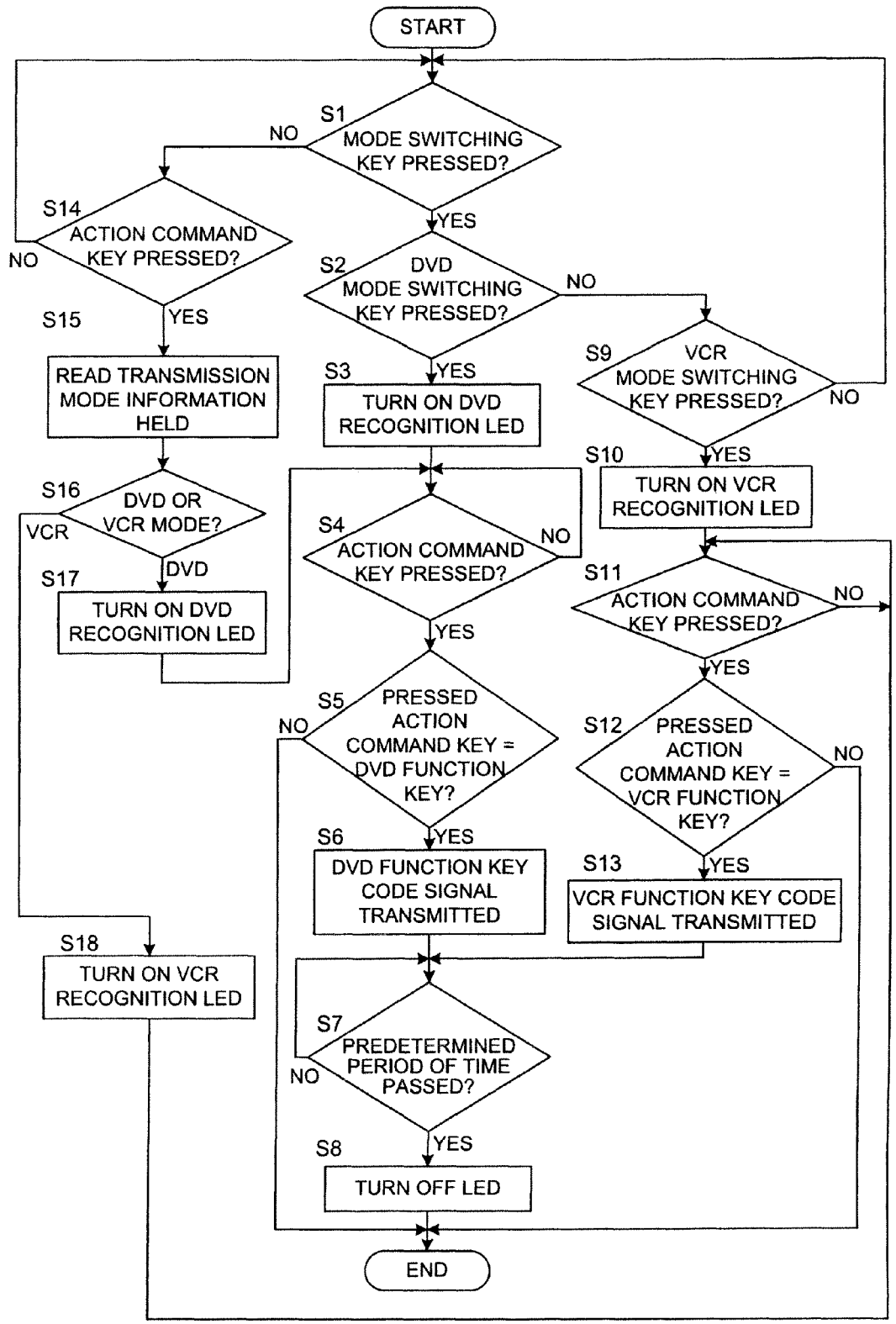
FIG. 8 is a flowchart for explaining a process of turning on a transmission mode recognition LED of the remote control device according to the present embodiment.

FIG. 8 is a flowchart for explaining a process of turning on the transmission mode recognition LED of the remote control device according to the present embodiment. With reference to this flowchart and FIGS. 1-3, the process of turning on the transmission mode recognition LED of the remote control device will be described.

First, when the mode switching key 35 of the remote control device 3 is pressed (Step S1), the micro computer 30 decides whether the pressed mode switching key 35 is the DVD mode switching key 35a (Step S2) or the VCR mode switching key 35b (Step S9). Then, if it is the DVD mode switching key 35a that was pressed, the micro computer 30 activates the LED driving circuit 40 to turn on the DVD recognition LED 38 by the process of the first light emitting element turning-on portion 311 of the CPU 31 (Step S3).

After that, when the action command key 36 of the remote control device 3 is pressed (Step S4) and the micro computer 30 decides that the pressed action command key 36 is a DVD function key (Step S5), a DVD function key code signal is transmitted from the transmission portion 37 (Step S6). When a predetermined period of time has passed after this transmission of the DVD function key code signal (Step S7), the micro computer 30 stops the drive driving the LED driving circuit 40 so as to turn off the DVD recognition LED 38 by the process of the light emitting element shutoff portion 313 of the CPU 31 (Step S8).

On the other hand, if the micro computer 30 determined that the VCR mode switching key 35b was pressed (Step S9), the micro computer 30 activates the LED driving circuit 40 to turn on the VCR recognition LED 39 by the process of the first light emitting element turning-on portion 311 of the CPU 31 (Step S10).

Next, when the action command key 36 of the remote control device 3 is pressed (Step S11) and the micro computer 30 determines that the pressed action command key 36 is a VCR function key (Step S12), a VCR function key code signal is transmitted from the transmission portion 37 (Step S13). When a predetermined period of time has passed after this transmission of the VCR function key code signal (Step S7), the micro computer 30 stops driving the LED driving circuit 40 so as to turn off the VCR recognition LED 39 by the process of the light emitting element shutoff portion 313 of the CPU 31 (Step S8).

In addition, if the action command key 36 is pressed (Step S14) without pressing of the mode switching key 35 (Step S1), the CPU 31 of the micro computer 30 reads out the transmission mode information stored in the flash ROM 32 up until this action (Step S15) and determines whether the transmission mode of the remote control device 3 is the DVD mode or the VCR mode in accordance with the transmission mode information thus read (Step S16). If it is determined that the transmission mode is the DVD mode, the micro computer 30 activates the LED driving circuit 40 to turn on the DVD recognition LED 38 by the process of the second light emitting element turning-on portion 312 of the CPU 31 (Step S17). If it is determined that the transmission mode is the VCR mode, the micro computer 30 activates the LED driving circuit 40 to turn on the VCR recognition LED 39 by the process of the second light emitting element turning-on portion 312 of the CPU 31 (Step S18).

Figure 9:
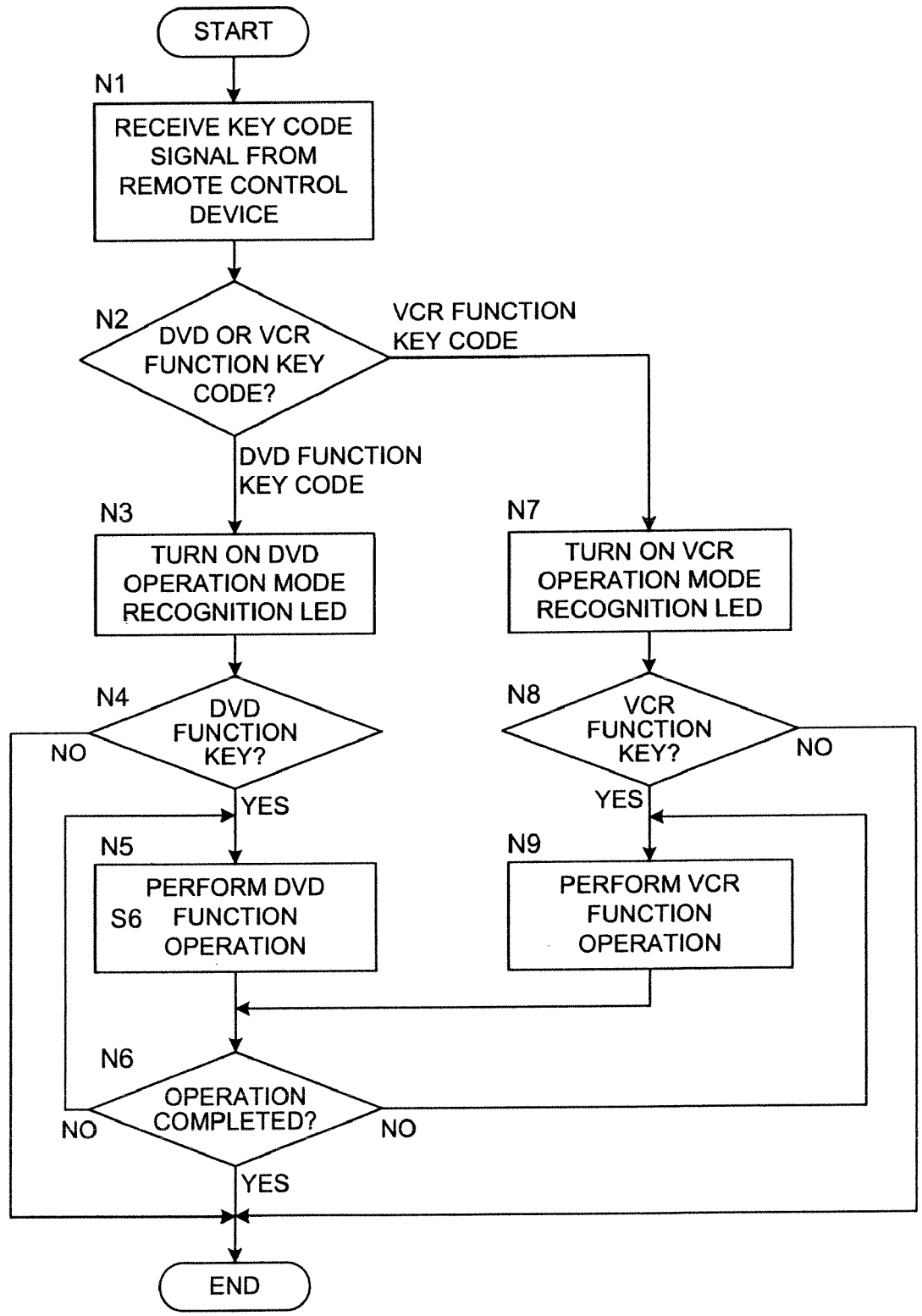
FIG. 9 is a flowchart for explaining a process of turning on an operation mode recognition LED of the composite electronic apparatus according to the present embodiment.

FIG. 9 is a flowchart for explaining a process and the like of turning on the operation mode recognition LED of the composite electronic apparatus according to the present embodiment. With reference to this flowchart and FIGS. 1-3, the process and the like of turning on the operation mode recognition LED of the composite electronic apparatus will be described.

Concerning the main body portion of the composite electronic apparatus A, when the infrared key code signal from the remote control device 3 is received by the reception portion 182 (Step N1), the reception portion 182 converts the signal into a key code signal of an electric signal, which is fed to the system controller 16. Thus, the system controller 16 determines whether a key code indicated in the key code signal is a DVD function key code or a VCR function key code in accordance with its code format (Step N2).

If it is determined that the key code is a DVD function key code, the system controller 16 controls the light emitting element turning-on portion 201 of the display drive portion 20, so that the light emitting element turning-on portion 201 turns on the DVD operation mode recognition LED 183 (Step N3). Furthermore, if the system controller 16 determines that the DVD function key is operated (Step N4), a DVD function is performed (Step N5). For example, if a reproduction key (PLAY key) of the remote control device 3 is pressed, the DVD recorder 1 performs a reproduction operation as the DVD function. Then, this process is finished when the reproduction operation is completed.

On the other hand, if it is determined that the key code is a VCR function key code, the system controller 16 controls the light emitting element turning-on portion 201 of the display drive portion 20, so that the light emitting element turning-on portion 201 turns on the VCR operation mode recognition LED 26 (Step N7). Furthermore, if the system controller 16 determines that the VCR function key is operated (Step N8), the VCR function is performed (Step N9). For example, if the reproduction key (PLAY key) of the remote control device 3 is pressed, the VCR 2 performs a reproduction operation as the VCR function. Then, this process is finished when the reproduction operation is completed.

As described above, according to the present embodiment, when the mode switching key of the remote control device is operated, the corresponding transmission mode recognition LED is turned on, so the user can see which electronic device (the DVD recorder or the VCR) the selected transmission mode corresponds to. In addition, when the action command key of the remote control device is operated, the corresponding transmission mode recognition LED is turned on, so the user can see which electronic device (the DVD recorder or the VCR) the currently selected transmission mode of the remote control device corresponds to. By these arrangements, a misoperation of the remote control device can be prevented, and remote control operations for electronic devices can be easily achieved. In addition, the main body of the composite electronic apparatus turns on the light emitting element for recognizing a operation mode corresponding to the operation target of electronic device (the DVD recorder or the VCR) indicated in the key code signal received from the remote control device, so that user can confirm the current operation mode of the composite electronic apparatus.

In this way, since the remote control device side is provided with the light emitting element for recognizing a transmission mode while the main body of the composite electronic apparatus is provided with the light emitting element for recognizing a operation mode, the user can fully understand the remote control operation. Thus, a misoperation can be prevented, and usability of the apparatus is improved. In addition, this reduces a possibility that the user misunderstands that the remote control device is broken down. Furthermore, when a predetermined period of time has passed after the transmission of the key code, the light emitting element for recognizing a transmission mode is turned off, so the power of the battery inside the remote control device is less consumed.

Note that it is possible to use the slide switch 35c as shown in FIG. 4 instead of the DVD mode switching key 35a and the VCR mode switching key 35b as shown in FIG. 3. Furthermore, it is possible to provide the DVD operation mode recognition LED 183 and the VCR operation mode recognition LED 26 as shown in FIG. 5 to the display unit 181 as shown in FIG. 6. Moreover, it is also possible to eliminate the DVD operation mode recognition LED 183 and the VCR operation mode recognition LED 26 as shown in FIG. 6 and to display characters indicating the operation mode (a name of the operation target of electronic device) on the display unit 181 as shown in FIG. 7.

Although a composite electronic apparatus that is a combination of the DVD recorder and the VCR is described in the present embodiment, the present invention is not limited to this but can be applied to any composite electronic apparatuses that is a combination of various electronic devices. For example, the present invention can be applied to a composite electronic apparatus that is a combination of a hard disk recorder and a DVD recorder (or a DVD player), a composite electronic apparatus that is a combination of a hard disk recorder and a VCR, a composite electronic apparatus that is a combination of a hard disk recorder, a DVD recorder (or a DVD player), and a VCR, and the like.

What is claimed is:

1. A composite electronic apparatus comprising a remote control device for transmitting different key code signals for operation and a main body of the composite electronic apparatus made up of a plurality of electronic devices having different functions, wherein the remote control device includes:

a plurality of light emitting elements for recognizing transmission modes, the plurality of light emitting elements corresponding to mode switching keys implemented with press switches or slide switches for designating an operation target among a plurality of electronic devices; and a first light emitting element turning-on portion for turning on the light emitting element for recognizing a transmission mode corresponding to an operation of the mode switching key among the plurality of light emitting elements for recognizing transmission modes when the mode switching key is operated, wherein the main body of the composite electronic apparatus includes:

a plurality of light emitting elements for recognizing operation modes and emitting light in the same color or different colors, plurality of light emitting elements corresponding to the plurality of electronic devices; and a light emitting element turning-on portion for turning on the light emitting element for recognizing a operation mode corresponding to the operation target of electronic device indicated in the key code signal received from the remote control device, wherein the remote control device further includes a second light emitting element turning-on portion for turning on the light emitting element for recognizing a transmission mode when an action command key which is an operation key different from the mode switching key is operated, the light emitting element for recognizing a transmission mode being turned on to indicate the operation target in accordance with transmission mode information held until the action command key is operated.

2. The composite electronic apparatus according to claim 1, wherein the remote control device further includes a light emitting element shutoff portion for turning off the light emitting element for recognizing a transmission mode which remains lit when a predetermined period has passed after the key code signal was transmitted.

3. The composite electronic apparatus according to claim 1, wherein the remote control device further includes a light emitting element shutoff portion for turning off the light emitting element for recognizing a transmission mode which remains lit when a predetermined period has passed after the key code signal was transmitted.

4. The composite electronic apparatus according to claim 1, wherein the main body of the composite electronic apparatus further includes a name display portion for making a display unit display a name of the operation target of an electronic device indicated by the key code signal received from the remote control device.

5. A composite electronic apparatus comprising a remote control device for transmitting different key code signals for operation and a main body of the composite electronic apparatus made up of a plurality of electronic devices having different functions, wherein the remote control device includes:

a plurality of light emitting elements for recognizing transmission modes, the plurality of light emitting elements corresponding to mode switching keys implemented with press switches or slide switches for designating an operation target among a plurality of electronic devices;

a first light emitting element turning-on portion for turning on the light emitting element for recognizing a transmission mode corresponding to an operation of the mode switching key among the plurality of light emitting elements for recognizing transmission modes when the mode switching key is operated;

a second light emitting element turning-on portion for turning on the light emitting element for recognizing a transmission mode when an action command key which is an operation key different from the mode switching key is operated, the light emitting element for recognizing a transmission mode being turned on to indicate the operation target in accordance with transmission mode information held until the action command key is operated; and a light emitting element shutoff portion for turning off the light emitting element for recognizing a transmission mode which remains lit when a predetermined period has passed after the key code signal was transmitted, wherein the main body of the composite electronic apparatus includes:

a plurality of light emitting elements for recognizing operation modes and emitting light in the same color or different colors, plurality of light emitting elements corresponding to the plurality of electronic devices; and a light emitting element turning-on portion for turning on the light emitting element for recognizing a operation mode corresponding to the operation target of electronic device indicated in the key code signal received from the remote control device and/or a name display portion for making a display unit display a name of the operation target of an electronic device indicated by the key code signal received from the remote control device.

* * * * *